United States Patent [19]
Bezos

[11] Patent Number: 5,975,651
[45] Date of Patent: *Nov. 2, 1999

[54] DUAL CONNECTION EP BRAKE SYSTEM

[75] Inventor: Angel P. Bezos, Rockwood, Md.

[73] Assignee: Westinghouse Air Brake Company, Wilmerding, Pa.

[*] Notice: This patent is subject to a terminal disclaimer.

[21] Appl. No.: 08/835,860

[22] Filed: Apr. 8, 1997

[51] Int. Cl.[6] .................................................. B60T 15/14
[52] U.S. Cl. .............................................................. 303/20
[58] Field of Search ..................................... 303/3, 20, 15

[56]         References Cited

U.S. PATENT DOCUMENTS 5,630,565   5/1997   Lumbis ........................................ 303/3
    5,808,370   9/1998   Bezos ........................................ 307/9.1

*Primary Examiner*—Matthew C. Graham
*Attorney, Agent, or Firm*—James Ray & Associates

[57]         ABSTRACT

A dual connection system is used with an electrical apparatus having power and return lines each of which requiring interconnection between parts of the apparatus. The system includes a connector at each end of each part through which the parts interconnect serially. Each connector has a pair of bidirectional circuits each of which interconnecting a main node and a backup node for each such line on a part such that one main node affixes to the power line and the other main node affixes to the return line. When a pair of By connectors are mated, the main nodes affixed to the power line communicate as a primary path and the backup nodes corresponding thereto communicate as a redundant path. Likewise, the main nodes affixed to the return line communicate as a primary path and the backup nodes corresponding thereto communicate as a redundant path. Each redundant path provides backup to its corresponding primary path thereby providing the apparatus with more reliable electrical connections. The system includes a control device in each part that during a test mode tests the integrity of the primary and redundant paths located between the part on which the device is situated and a previous part. The system further includes a central computer that controls each control device so each pair of mated connectors is tested sequentially during the test mode and that receives from each control device results of the testing and that reports the results to an operator of the apparatus.

20 Claims, 3 Drawing Sheets

DUAL CONNECTION EP BRAKE SYSTEM

CROSS-REFERENCE TO RELATED APPLICATIONS

This application is related to copending application Ser. No. 08/835,859 entitled SIMPLIFIED DUAL CONNECTION EP BRAKE SYSTEM. The copending application shares with the present application the same filing date, Apr. 8, 1997, now U.S. Pat. No. 5,808,370. The copending application is assigned to the assignee of the present invention, and its teachings are incorporated into the present document by reference.

FIELD OF THE INVENTION

The present invention generally relates to a system for electrically interconnecting rail vehicles of a train. More particularly, the present invention pertains to a dual connection system which features both a primary and a redundant electrical path for each electrical line interconnected between adjacently disposed rail vehicles. Even more particularly, the present invention pertains to a means of testing the integrity of each of the primary and redundant electrical paths and of reporting to an operator of the train whether any of those paths are functional or defective.

BACKGROUND OF THE INVENTION

Most brake control systems used in the train industry today are electropneumatic in nature. These electropneumatic brake control systems consist of pneumatic and electropneumatic components and other related mechanical apparatus controlled by a centrally located electronic brake control unit. Though electropneumatic brake control systems feature the electronic brake control unit, the brakes of trains so equipped are still applied and release pneumatically via brake cylinder control valves and brake cylinders. Entirely electronic brake control systems, however, should eventually be developed. These will control electrical brake components such as electrical motors that will apply and release the train brakes electrically without the need of pneumatic backup systems.

It is well known that electronic systems are generally capable of processing and responding more quickly to a greater variety of input parameters than equivalent, though outmoded, mechanical systems. Electronic systems also typically require less physical space to implement than the bulky mechanical hardware that they replace. This factor yields a reduction in weight and an increase in available space thereby making trains so equipped more fuel efficient and capable of transporting more cargo and passengers. Electronic systems also exhibit greater reliability and thus require less physical maintenance than mechanically implemented systems.

A typical train includes at least one locomotive, one or more rail vehicles and a plurality of trainlines. The trainlines include both pneumatic and electrical lines which generally run from a head of train locomotive to a last rail vehicle in the train. These pneumatic and electrical trainlines connect to pneumatically controlled brakes and electrical devices, respectively, in each of the rail vehicles. In a locomotive, the pneumatic trainlines include an actuating pipe, a main reservoir equalizing (MER) pipe, and an independent application and release (IAR) pipe. Within a locomotive consist (i.e., two or more locomotives interconnected), each of the MER, actuating and IAR pipes respectively interconnect with the MER, actuating and IAR pipes of the other locomotives. These are the pipes that serve to supply air to each of the pneumatically controlled brake components situated on each of the locomotives.

The pneumatic trainlines also include a brake pipe whose pressure mimics pressure within a storage tank called an equalization reservoir. The brake pipe consists of a series of individual pipes interconnected serially. Usually secured to the underside of each rail vehicle, each individual pipe is interconnected to another such individual pipe via a flexible coupler situated between each rail vehicle. Connected to the equalization reservoir, the brake pipe is thus one long continuous pipe run from the head of train locomotive to the last rail vehicle. It is the brake pipe that connects and supplies air to each of the pneumatically controlled brake components situated on each of the rail vehicles.

The electrical trainlines generally include a power line, a return line and various control lines along with any number of other electrical lines. As with the brake pipe, each electrical trainline actually constitutes a series of individual wires interconnected serially. Typically secured to the underside of each rail vehicle within a separate protective conduit, each individual wire is interconnected to another individual wire to which it corresponds via a connector situated between each rail vehicle to form one of the electrical trainlines of the train. These separate protective conduits are thus interconnected serially to form a protective cable that runs from the head of train locomotive to the last rail vehicle. Though actually formed from a series of interconnected protective conduits, this protective cable is often itself referred to as "the electrical trainline" even though it actually houses multiple electrical trainlines.

The typical locomotive has an electropneumatic brake control system such as WABCO EPIC® Brake Equipment. Such a brake control system generally includes an electronic brake control unit for controlling overall operation of the brakes; a cab station unit for providing various inputs to the brake control unit including the positions of the automatic and independent brake handles through which to control the brakes on the entire train and the locomotive(s), respectively; a keyboard for accessing the brake equipment including providing certain set-up parameters; a display for monitoring brake equipment operation; a locomotive interface unit for connecting both electrical power and the electrical trainlines to the brake equipment; and a pneumatic operating unit having solenoid valves for controlling pressures in the pneumatic trainlines and in the reservoirs so as to control the brakes pneumatically according to commands received from the brake control unit.

These electropneumatic brake control systems are designed so that failure of any one of the pneumatic interconnections between any of the rail vehicles (or any other failure causing a loss of pressure in the pneumatic pipes) guarantees an emergency application of the brakes on all the vehicles of the train. Such electronic control of pneumatic braking componentry as well as the pneumatic componentry itself has proven quite dependable. Consequently, emergency brake applications occur quite infrequently given the reliability of current electropneumatic brake control systems and their associated pneumatic componentry and interconnections.

One of the foremost technical obstacles to overcome in the development of a completely electronically controlled brake system is the need for a reliable system for electrically interconnecting each of the aforementioned electrical brake components that will be situated on each of the rail vehicles. In such a system, a brake control cable containing one or more electrical lines will be used to transmit brake control signals from the brake control unit to each of the electrical brake components on each of the rail vehicles.

The brake control cable will run from the head of train locomotive to the last rail vehicle in the train. Analogous to the segmented brake pipe of contemporary electropneumatic brake control systems, the brake control cable will consist of a series of individual electrical conduits. Secured to the underside of each rail vehicle, each individual conduit will be interconnected to another individual conduit via a connector device situated between each rail vehicle to form the brake control cable. Originating in the brake control unit, these control signals will be used to command the electrical brake components to apply and release the train brakes electrically. If implemented on a freight train, which often consists of one hundred or so rail vehicles, such a completely electronic system would require as many connectors, especially if a one line brake control system is envisioned. The completely electronic system could even require double as many connectors or more depending on the design of the brake control conduit; two connectors, for example, could be employed to interconnect the rail vehicles in a two line system. Failure of the electrical connections between just one pair of adjacently disposed rail vehicles in such a system would give rise to an emergency brake application, a prospect that both train operator and customer fervently hope to avoid. Thus, the reliability of the electrical connectors in an entirely electronic brake control system is of paramount importance.

Many individuals in the railway industry contend that a completely electronically controlled brake system would be neither sufficiently reliable nor economically feasible when compared to contemporary electropneumatic brake control systems. The likelihood of connector failures in a completely electronic brake control system is said to be too great. This persuades some that brake control systems will always require some pneumatic componentry as back up to whatever type of electronics that would be employed in such a system.

The present invention addresses the aforementioned obstacles to the development of a completely electronic brake control system. Akin to the couplers used to interconnect the individual pipes serially to form the brake pipe of contemporary electropneumatic brake control systems, the present invention provides a dual connection system for interconnecting the electronic brake components between each of the rail vehicles so as to form one variant of the aforementioned brake control cable. Featuring a pair of electrical paths for each line to be interconnected between rail vehicles and a means of testing the integrity of same, the present invention will provide highly reliable electrical connections for use with the entirely electronic brake control systems of the future. It should be apparent after reading this document that the present invention could also be adapted to any number of other electrical applications, even those unrelated to railway industry applications. Obvious modifications may be necessary, though, depending upon the specific application in which the present invention is employed.

It should be noted that the foregoing background information is provided to assist the reader in understanding the present invention. Accordingly, any terms used herein are not intended to be limited to any particular narrow interpretation unless specifically stated otherwise in this document.

SUMMARY OF THE INVENTION

In a presently preferred embodiment, the present invention provides a dual connection system for an electrical system of a train. The electrical system has a power line and a return line each of which requiring electrical interconnection between serially interconnectable rail vehicles of the train. The dual connection system includes a mateable connector at each end of each of the vehicles through which the electrical system interconnects serially from a head of train vehicle successively to an end of train vehicle. Each mateable connector has a pair of bidirectional circuits. Each bidirectional circuit interconnects a main node and a backup node for each such line disposed on the vehicle such that one of the main nodes affixes to the power line and the other of the main nodes affixes to the return line disposed on the vehicle. Each bidirectional circuit includes a normally closed backup switch and a pair of Schottky diodes connected in parallel circuit relationship with each other and the backup switch such that one diode allows current flow in a direction opposing that allowed by the other diode upon failure of the backup switch. When a pair of mateable connectors are mated, the main nodes affixed to the power line electrically communicate as a primary electrical path for the power line and the backup nodes corresponding thereto electrically communicate as part of a redundant electrical path for the power line. Likewise, the main nodes affixed to the return line electrically communicate as a primary electrical path for the return line and the backup nodes corresponding thereto electrically communicate as part of a redundant electrical path for the return line. With a pair of mateable connectors interconnecting each of the rail vehicles, during a nontest mode of operation of the dual connection system, each of the redundant electrical paths provides an electrical connection redundant to the primary electrical path corresponding thereto thereby providing the electrical system with more reliable electrical connections. The dual connection system also includes a connector control means in each of the vehicles. Each connector control means includes a test circuit interconnecting the backup nodes across the redundant electrical paths in each connector. The test circuit has a predetermined resistive load in series with a test switch normally open during a nontest mode of operation. Each connector control means selectively controls opening and closing of the backup and test switches within its vehicle during a test mode of operation so as to take voltage and current measurements at preselected sites. Through these voltage and current measurements, each connector control means determines the integrity of the primary and the redundant electrical paths located between the rail vehicle on which it is situated (i.e., a current one of the vehicles) and a previous one of the vehicles. The dual connection system further includes a central computer that controls each of the connector control means so that each of the pairs of connectors interconnecting the vehicles from the head of train vehicle to the end of train vehicle is tested sequentially during the test mode. The central computer also receives from each of the connector control means the results of each of the determinations made by the connector control means. The central computer also reports the results of the determinations to an operator of the train.

OBJECTIVES OF THE INVENTION

It is, therefore, a primary objective of the present invention to provide a highly reliable dual connection system for electrically interconnecting the electronic brake components of a completely electronic brake control system of a train.

Another objective of the present invention is to provide a dual connection system having a primary and a redundant electrical path for each electrical line to be interconnected between each of the adjacently disposed rail vehicles of a train so that for each primary electrical path that has failed the redundant electrical path to which it corresponds electrically bypasses and functions in place of the affected primary electrical path.

Yet another objective of the present invention is to provide a dual connection system that has a primary and a redundant electrical path for each electrical line to be interconnected between each of the adjacently disposed rail vehicles of a train and that is capable of testing the integrity of those paths and of reporting the results of that testing to an operator of the train.

In addition to these objectives and advantages, various other objectives and advantages will become more readily apparent to persons skilled in the electrical connector art from a reading of the detailed description section of this document. The other objectives and advantages will become particularly apparent when the detailed description is considered in conjunction with the attached drawings and with the appended claims.

DETAILED DESCRIPTION OF THE INVENTION

Figure 1:
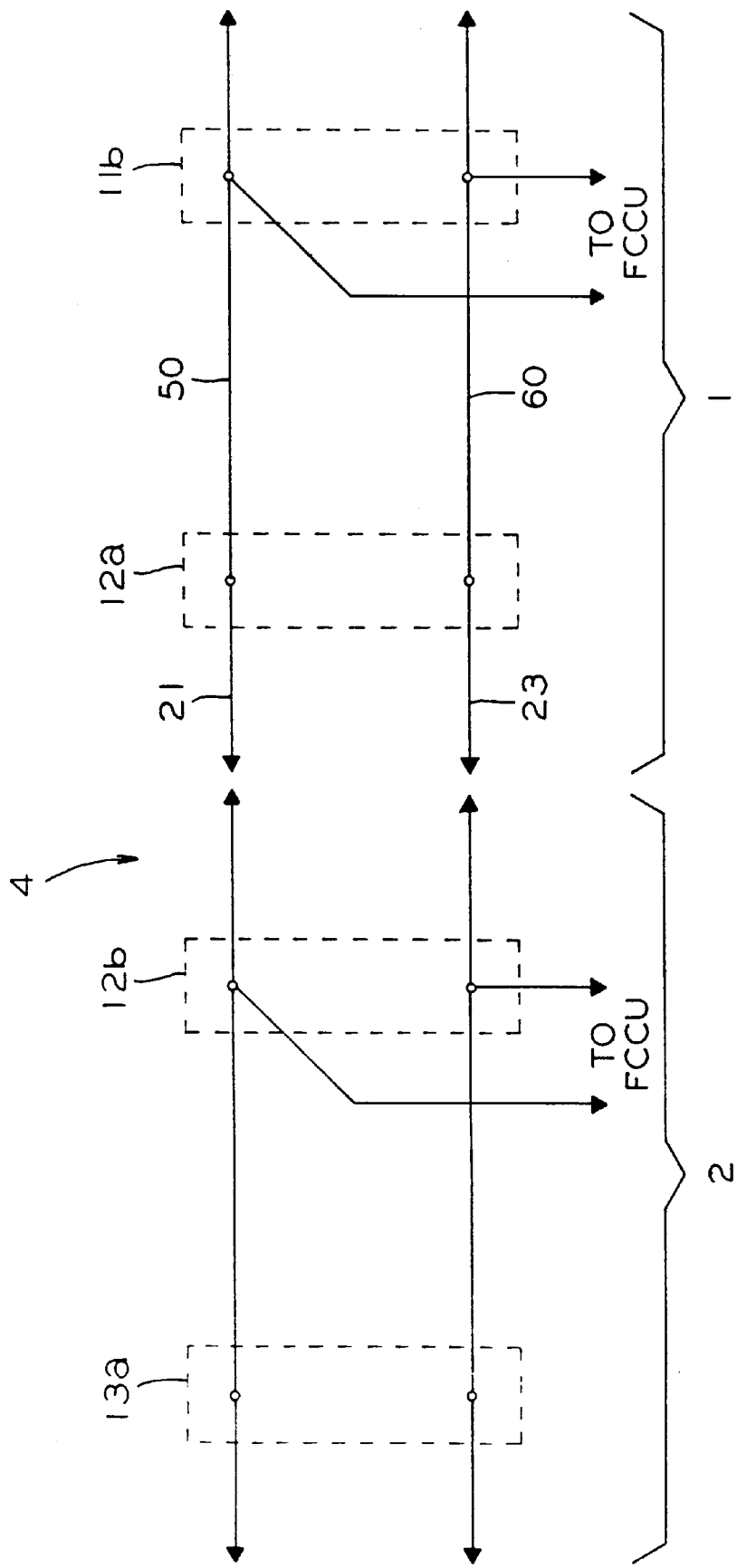
FIG. 1 is a schematic view of a prior art connection scheme through which two lines of a two line electrical system are interconnected between a pair of adjacently disposed rail vehicles.

Before describing the present invention in detail, the reader is advised that, for the sake of clarity and understanding, identical components having identical functions in each of the accompanying drawings have been marked where possible with the same reference numerals in each of the Figures provided in this document.

Referring now to the drawings, FIG. 1 illustrates a schematic view of a prior art connection scheme, generally designated 4, through which electrical lines 50 and 60 of an electrical system (not shown) are interconnected between a pair of adjacently disposed rail vehicles 1 and 2 of a train. Though any number of lines of one or more electrical systems may be interconnected in the manner shown, a two line electrical system has been arbitrarily selected as such systems typically bear dedicated power 50 and return 60 electrical lines and are, of course, easily illustrated. The power and return lines 50 and 60 each require electrical interconnection between the serially interconnectable rail vehicles 1 and 2 of the train so as to supply power to the various electrical and electronic systems situated on each of the rail vehicles. The prior art connection scheme 4 includes a typical mateable connector (e.g., 11b, 12a, 12b and 13a) at each end of each of the rail vehicles through which the electrical system interconnects serially from a head of train vehicle successively to an end of train vehicle. The head of train vehicle typically contains the power source for the electrical system. When adjacently disposed rail vehicles are electrically interconnected, power is supplied to each of the rail vehicles through the power line 50, with the return line 60 completing the electrical circuit. Each pair of adjacently disposed rail vehicles (e.g., pair 1 and 2) is therefore interconnected electrically through two electrical paths 21 and 23. One electrical path 21 connects the power line 50 between each pair of adjacently disposed rail vehicles (e.g., pair 1 and 2) while another electrical path 23 so connects the return line 60. Failure of just one of the electrical paths 21 and 23 between just one pair of adjacently disposed rail vehicles could give rise to a serious problem depending upon the type of electrical system interconnected by the prior art connection scheme. For example, if the prior art connection scheme were to be used with the aforementioned completely electronic brake control system, failure of just one of the electrical paths between just one pair of adjacently disposed rail vehicles would require an emergency brake application, an outcome that is most undesirable. The present invention was developed to address such problems.

Figure 2:
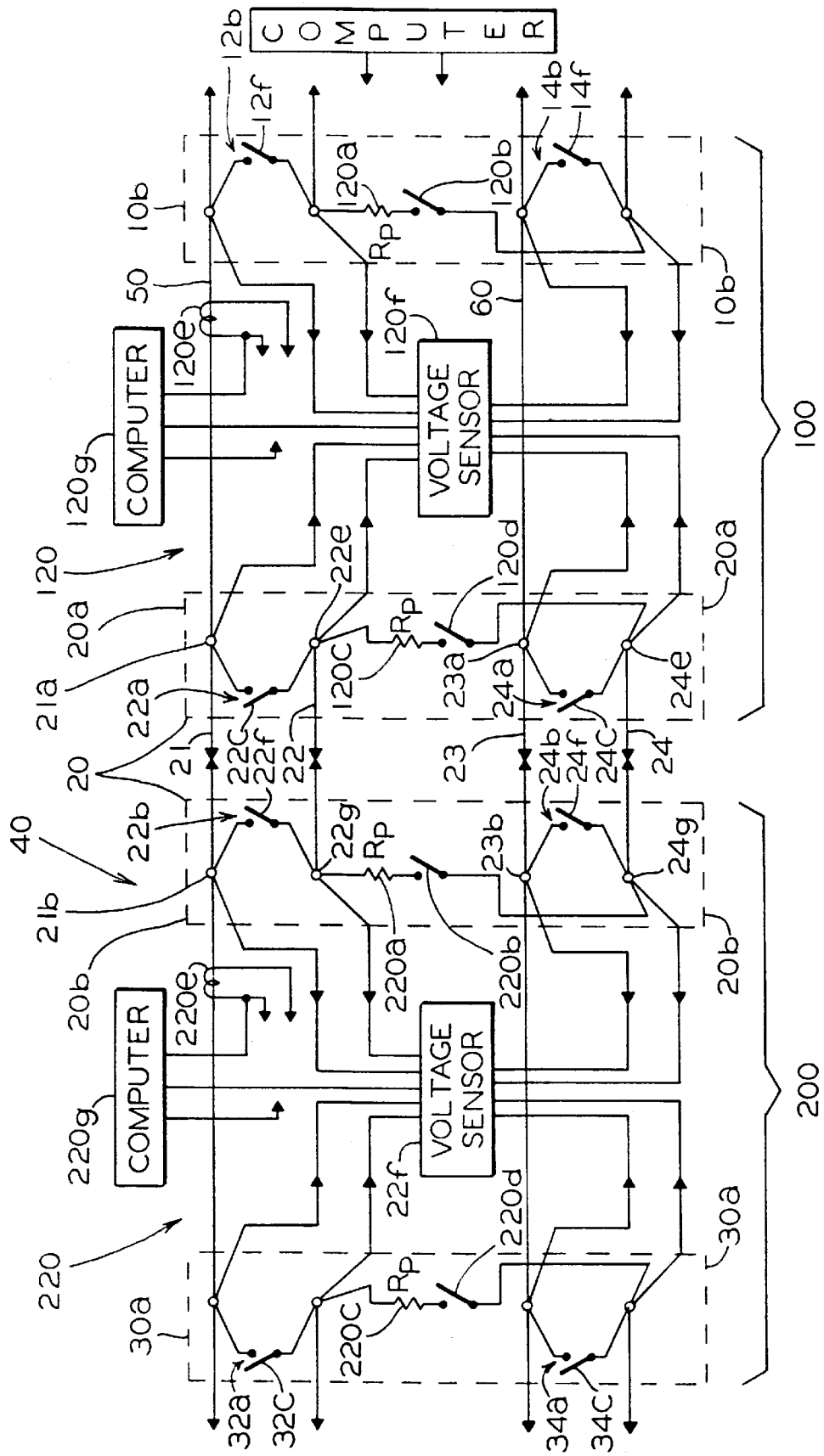
FIG. 2 is a partial schematic view of an alternative embodiment of the present invention illustrating a pair of connectors mated to interconnect the two lines of a two line electrical system between a pair of adjacently disposed railcars.
Figure 3:
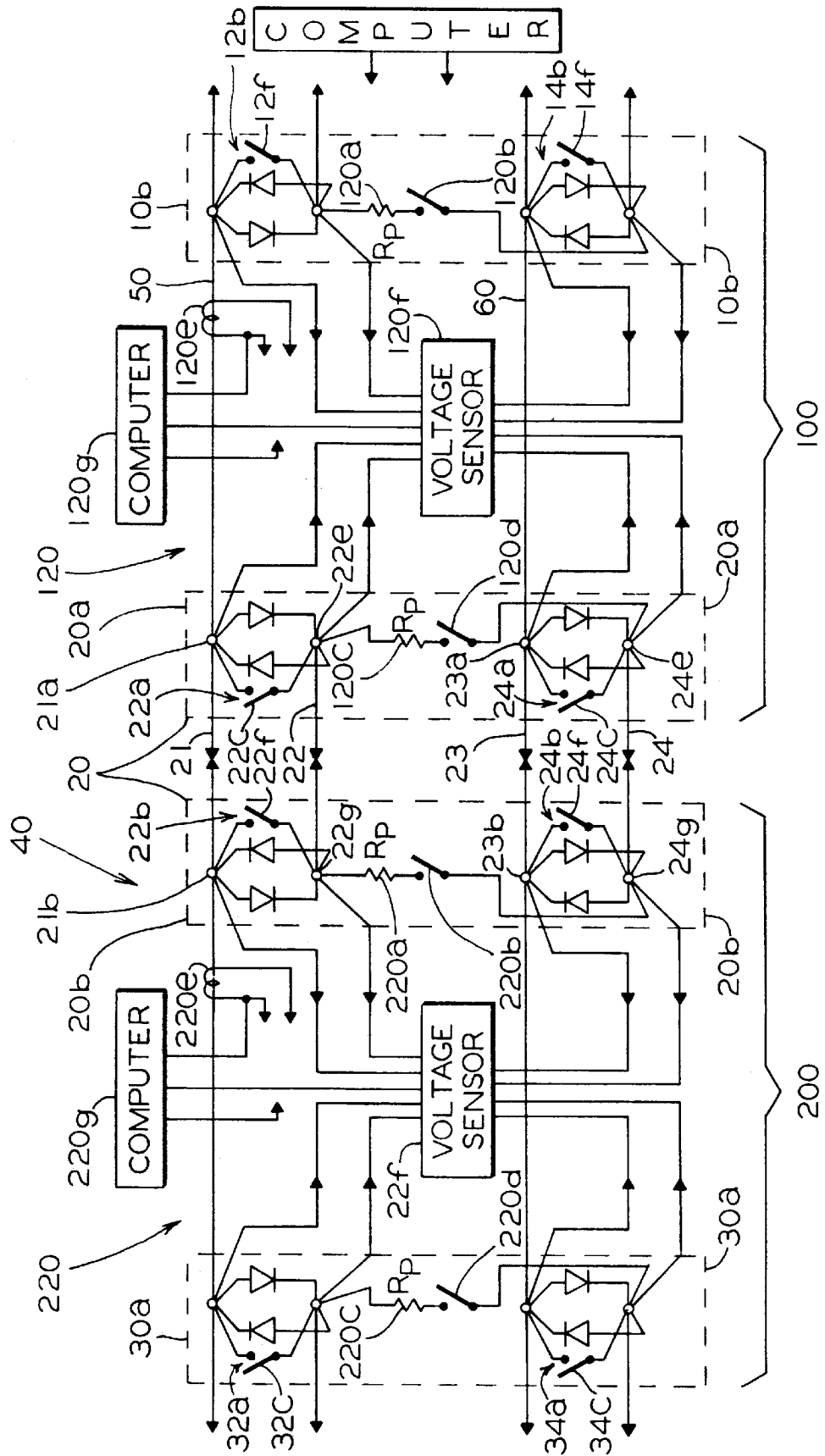
FIG. 3 is a partial schematic view of the presently preferred embodiment of the present invention illustrating a pair of connectors mated to interconnect the two lines of a two line electrical system between a pair of adjacently disposed railcars.

FIGS. 2 and 3 illustrate the essential details of an alternative embodiment and a presently preferred embodiment, respectively, of the present invention. Referring first to FIG. 2, the present invention, generally designated 40, provides a dual connection system 40 for an electrical system (not shown) of a train. The electrical system has a power line 50 and a return line 60 each of which requiring electrical interconnection between serially interconnectable rail vehicles (e.g., 100 and 200) of the train. The dual connection system 40 includes a mateable connector at each end of each of the rail vehicles through which the electrical system interconnects serially from a head of train vehicle successively to an end of train vehicle. For example, as shown in FIG. 2, vehicle 100 has mateable connector 10b at one end and mateable connector 20a at the other end while vehicle 200 has mateable connectors 20b and 30a at opposite ends.

Each mateable connector has a pair of bidirectional circuits. Each bidirectional circuit interconnects a main node and a backup node for each such electrical line disposed on each rail vehicle. One of the main nodes affixes to power line 50 and the other of the main nodes affixes to return line 60 disposed on each rail vehicle. Each bidirectional circuit includes a normally closed backup switch, preferably taking the form of a field effect transistor. For example, as shown in FIG. 2, mateable connector 20b has a pair of bidirectional circuits 22b and 24b. Bidirectional circuit 22b interconnects main node 21b and backup node 22g for power line 50 disposed on rail vehicle 200. Bidirectional circuit 22b includes normally closed backup switch 22f. Likewise, bidirectional circuit 24b interconnects main node 23b and backup node 24g for return line 60 disposed on rail vehicle 200. Bidirectional circuit 24b includes normally closed backup switch 24f. Main node 21b affixes to power line 50 and main node 23b affixes to return line 60.

Mateable connectors 10b, 20a and 30a are each identical to mateable connector 20b, though the reference numerals assigned to their components differ so as to avoid confusion in describing the present invention 40. When a pair of mateable connectors such as connectors 20a and 20b are mated, the main nodes 21a and 21b affixed to power line 50 in vehicles 100 and 200, respectively, electrically communicate as a primary electrical path 21 for power line 50. The backup nodes 22e and 22g respectively corresponding main nodes 21a and 21b electrically communicate as part of a redundant electrical path 22 for power line 50. Likewise, the main nodes 23a and 23b affixed to return line 60 in vehicles 100 and 200, respectively, electrically communicate as a primary electrical path 23 for return line 60. The backup nodes 24e and 24g respectively corresponding to main nodes 23a and 23b electrically communicate as part of a redundant electrical path 24 for return line 60.

Each of the other rail vehicles of the train are electrically interconnected, through dual connection system 40, in the same manner as are rail vehicles 100 and 200. Rail vehicle 100, for example, would interconnect via mateable connector 10b to a previous rail vehicle, perhaps the head of train locomotive (not shown). Similarly, rail vehicle 200 would interconnect via mateable connector 30a to a subsequent rail vehicle, perhaps the end of train vehicle (not shown). With a pair of mateable connectors interconnecting each of the rail vehicles, during a nontest mode of operation of the dual connection system 40, each of the redundant electrical paths provides an electrical connection redundant to the primary electrical path corresponding thereto thereby providing the electrical system with more reliable electrical connections. Accordingly, there will be current sharing between each primary electrical path and its corresponding redundant electrical path in the alternative embodiment of the present invention. For example, assuming a current of 10 amps flowing along power line 50 in rail vehicle 100, primary electrical path 21 may carry 6 amps and redundant electrical path 22 may carry 4 amps.

The dual connection system 40 also includes a connector control means in each of the rail vehicles of the train. Each it connector control means, generally designated 120 and 220 in FIGS. 2 and 3, includes two test circuits, a voltage sensing means, a current sensing means and a vehicle computer which connects to a centrally located computer 150, preferably the computer of the head of train locomotive, via electrical lines (not shown). Each test circuit includes a predetermined resistive load $R_P$ in series with a test switch, the latter preferably taking the form of a field effect transistor. Rail vehicle 200 as shown in FIG. 2, for example, has connector control means 220. Connector control means 220 includes test circuit 220a and b, test circuit 220c and d, voltage sensor 220f, current sensor 220e and vehicle computer 220g. Test circuit 220a and b interconnects backup nodes 22g and 24b across redundant electrical paths 22 and 24 in connector 20b. The test circuit 220a and b has predetermined resistive load 220a in series with test switch 220b normally open during the nontest mode of operation. Similarly, test circuit 220c and d includes predetermined resistive load 220c in series with normally open test switch 220d interconnecting the backup nodes of bidirectional circuits 32a and 34a in connector 30a. The voltage sensor 220f of connector control means 220 is connected to measure voltage across any two of several preselected sites including the nodes of connector 20b and the nodes of connector 30a. The current sensor 220e of connector control means 220 is preferably situated as shown in FIG. 2 so as to measure current flowing in power line 50 in rail vehicle 200. The vehicle computer 220g of connector control means 220 connects to current sensor 220e and voltage sensor 220f of rail vehicle 200.

Each of the connector control means of the other rail vehicles of the train are disposed in the same manner as is connector control means 220 of rail vehicle 200. Connector control means 120 of rail vehicle 100, for example, includes test circuit 120a and b, test circuit 120c and d, voltage sensor 120f, current sensor 120e and vehicle computer 120g. Test circuit 120a and b includes predetermined resistive load 120a in series with normally open test switch 120b interconnecting the backup nodes of bidirectional circuits 12b and 14b in connector 10b. Similarly, test circuit 120c and d includes predetermined resistive load 120c in series with normally open test switch 120d interconnecting the backup nodes of bidirectional circuits 22a and 24a in connector 20a. The voltage sensor 120f of connector control means 120 is connected to measure voltage across any two of several preselected sites including the nodes of connector 10b and the nodes of connector 20a. The current sensor 120e of connector control means 120 is preferably situated as shown in FIG. 2 so as to measure current flowing in power line 50 in rail vehicle 100. The vehicle computer 120g of connector control means 120 connects to current sensor 120e and voltage sensor 120f of rail vehicle 100.

The dual connection system 40 may be placed into a test mode of operation through central computer 150. This test mode may it be initiated either automatically or at the instance of a train operator, and preferably completed prior to departure of the train from a train station. If initiated automatically, central computer 150 may be programmed to commence the test mode after the train has remained stationary for a predetermined amount of time or according to other predetermined criteria. During the test mode, central computer 150 controls each of the connector control means so that each pair of connectors interconnecting the vehicles is tested sequentially from the head of train vehicle to the end of train vehicle. The central computer 150 is therefore preferably located in the head of train locomotive as noted previously. It is also preferred that the locomotive computer serve as central computer 150; though the locomotive computer would have to be provided with a programming means to enable the locomotive computer to perform, in addition to its locomotive functions, the functions attributed to central computer 150. Likewise, if each rail vehicle is already equipped with a computer, each of these preexisting computers may serve as the vehicle computers; though each preexisting computer would have to be provided with a vehicle programming means to enable the preexisting computers to perform, in addition to their standard functions, the functions attributed to vehicle computers.

During the test mode of operation, the dual connection system 40 tests the integrity of each of the electrical connections or paths between each of the rail vehicles sequentially. Specifically, the central computer 150 orders the connector control means of the first rail vehicle behind the head of train locomotive to test the integrity of the connections between the locomotive and the first rail vehicle. Once the first connector control means reports to central computer 150 that the connections between the head of train locomotive and the first rail vehicle are viable, the central computer 150 orders the connector control means of the second rail vehicle behind the head of train locomotive to test the integrity of the connections between the first and the second rail vehicles. This process is repeated until all of the connections between the rail vehicles have been tested. Note, however, that at least one path for each electrical line interconnected between rail vehicles must be viable to allow proper testing of the connections between subsequent rail vehicles.

For the purposes of the ensuing discussion, the previous rail vehicle refers to the rail vehicle whose connector control means has already tested and verified the connections between the previous rail vehicle and the rail vehicle immediately preceding it in the train. The current rail vehicle refers to the rail vehicle whose connector control means will be used to test and verify the connections between the current rail vehicle and the previous rail vehicle. It is also assumed for purposes of this discussion that two lines are to be interconnected between each rail vehicle and that each interconnection is to be accomplished through one pair of mateable connectors; one of the pair, of course, situated on the current rail vehicle and the other situated on the previous rail vehicle. It should also be apparent that the present invention may be adapted to interconnect any number of lines between adjacent rail vehicles through as many or less number of connectors.

Regarding the functions of a specific connector control means during the test mode of operation, the reader is directed to connector control means 220 shown in FIG. 2. Vehicle computer 220g, in response to an appropriate command received from central computer 150, controls the opening and closing of the backup switches (i.e., 22f, 24f, 32c and 34c) and test switches (i.e., 220b and 220d) of connectors 20b and 30a in current rail vehicle 200. Meanwhile, central computer 150 orders vehicle computer 120g to close all backup switches (i.e., 12f, 14f, 22c and 24c) and open both test switches (i.e., 120b and 120d) in previous rail vehicle 100. Specifically, vehicle computer 220g selectively opens and closes the backup and test switches of connectors 20b and 30a while at specific times sampling the current measured by current sensor 220e and taking voltage measurements at certain of the preselected sites through voltage sensor 220f. Through these current and voltage measurements and the predetermined resistive load 220a, vehicle computer 220g derives the resistances generally representative of the primary and redundant electrical paths located between current rail vehicle 200 and previous rail vehicle 100. Vehicle computer 220g is also programmed to compare these actual or calculated resistances to predetermined acceptable values and to report to central computer 150 whether either of the electrical paths or both are defective or functional on basis of the comparison. It should be apparent that central computer 150 rather than each of the vehicle computers could be used to derive the calculated resistances and to compare them to the predetermined acceptable values.

The actual resistances are calculated generally according to the following procedure during which voltage sensor 220f makes approximately four voltage measurements and current sensor 220e makes approximately two current measurements. The backup and test switches of current rail vehicle 200 and previous rail vehicle 100 must be set properly before making the voltage and current measurements. Regarding previous rail vehicle 100, all backup switches are closed and both test switches are opened and remain unchanged during testing of the electrical connections between current rail vehicle 200 and previous rail vehicle 100. Specifically, while all backup switches are closed and both test switches are open in previous rail vehicle 100 and all backup and test switches are open in current rail vehicle 200, voltage sensor 220f makes a first measurement of voltage across backup nodes 22g and 24g of connector 20b. While all backup switches are closed and both test switches are open in previous rail vehicle 100 and all backup and test switches are open in current rail vehicle 200 with exception of test switch 220b being closed, voltage sensor 220f makes a second measurement of voltage across backup nodes 22g and 24g of connector 20b. While all backup switches are closed and both test switches are open in previous rail vehicle 100 and all backup switches are closed and both test switches are open in current rail vehicle 200 with exception of backup switch 22f being open, voltage sensor 220f makes a third measurement of voltage across main node 21b and backup node 22g in connector 20b, and current sensor 220e makes a first measurement of current flowing in power line 50. While all backup switches are closed and both test switches are open in previous rail vehicle 100 and all backup switches are closed and both test switches are open in current rail vehicle 200 with exception of backup switch 24f being open, voltage sensor 220f makes a fourth measurement of voltage across main node 23b and backup node 24g in connector 20b, and current sensor 220e makes a second measurement of current flowing in power line 50.

Having made the voltage and current measurements, vehicle computer 220g (or alternatively central computer 150) then derives three separate resistances from the current and voltage measurements and the predetermined resistive load 220a, as alluded to previously. Specifically, the resistance $R_{RB}$ generally representative of the redundant electrical paths 22 and 24 of mated connector pair 20 is derived from the first and second voltage measurements and predetermined resistive load 220a, $R_P$. The first voltage measurement $v_1$ is essentially the open circuit voltage across test circuit 220a and b because test switch 220b is open and therefore no current flows through resistor $R_P$. This yields the equation $$v_{P-R} = v_1 + I_T R_{22c} + I_T R_{24c} + I_T R_{R1} + I_T R_{R2} \qquad (1).$$

where $v_{P-R}$ is the difference between the voltage levels of the power and return lines $v_P$ and $v_R$, respectively; $R_{22c}$ is the resistance of backup switch 22c; $R_{24c}$ is the resistance of backup switch 24c; $R_{R1}$ is the resistance representing the internodal connection between nodes 22e and 22g; $R_{R2}$ is the resistance representing the internodal connection between nodes 24g and 24e; and $I_T$ is the current flowing from power line 50 through backup switch 22c, redundant path 22, test circuit 220a and b, redundant path 24 through backup switch 24c to return line 60. Current $I_T$, however, is actually zero because test switch 220b is open. Equation (1) then becomes $$v_{P-R} = v_1 \qquad (2).$$

The second voltage measurement $v_2$ is essentially the closed circuit voltage across test circuit 220a and b. Because test switch 220b is closed, current $I_T$ flows through backup switch 22c, redundant path 22, test circuit 220a and b, redundant path 24 through backup switch 24c to return line 60. This yields the equation $$v_{P-R} = v_2 + I_T R_{22c} + I_T R_{24c} + I_T R_R \qquad (3)$$

where $I_T$ can be calculated from the known values of $v_2$ and the predetermined resistive load $R_P$ (preferably 230 ohms) from Ohm's law $$I_T = v_2 / R_P \qquad (4).$$

The resistance $R_{RB}$ generally representative of the redundant electrical paths 22 and 24 of connectors 20a and 20b is then calculated from equations (2), (3) and (4). This yields $$R_{RB} = (v_1 - v_2) / I_T \qquad (5)$$

where $v_1$, $v_2$ and $I_T$ are all known values; $v_1$ and $v_2$ from the first and second voltage measurements and $I_T$ from equation (4) above.

It should be apparent that $R_{RB}$ actually represents the combined resistances of backup switch 22c, the internodal electrical connection between backup nodes 22e and 22g, the internodal electrical connection between backup nodes 24g and 24e, and backup switch 24c. Consequently, if the actual $R_{RB}$ is unacceptably high as compared to the predetermined acceptable value for $R_{RB}$, it cannot be determined from actual resistance value $R_{RB}$ exactly which of those combined resistances accounts for the unacceptably high value. The actual resistance $R_{RB}$ merely reveals that one or more of the combined resistances is too high. The problem can then be corrected in either of two ways. Mated connector pair 20 could be replaced. Alternatively, both of the connectors 20a and 20b of mated connector pair 20 may be probed to determine which, if not both, should be repaired or replaced.

Once the actual $R_{RB}$ value has been found to be within a predetermined acceptable range, the resistance $R_{PP}$ generally representative of the primary electrical path 21 of mated connector pair 20 for power line 50 is derived from the first current and third voltage measurements. The third voltage measurement $v_3$ represents the voltage measured across backup switch 22f. Referring to FIG. 2, voltage $v_3$ can also be derived from the equation $$v_3 = v_{21b-21a} + v_{22c} + v_{22e-22g} \quad (6)$$

where $v_{21b-21a}$ is the internodal voltage drop across primary electrical path 21 for power line 50; $v_{22c}$ is the voltage drop across backup switch 22c; and $v_{22e-22g}$ is the voltage drop across backup nodes 22e and 22g. Though current I will be flowing across primary electrical path 21 along power line 50, there will be negligible current flowing through backup switch 22c and between backup nodes 22e and 22g because backup switch 22f and test switch 220b are both open. This negligible current is an extremely small current on the order of microamps and is due solely to voltage sensor 220f. This microamp level current gives rise to a microvoltage drop that is negligible in comparison to voltage drop $v_{21b-21a}$ across primary electrical path 21 interconnecting main nodes 21a and 21b of mated connector pair 20. Equation (6) then becomes $$v_3 = v_{21b-21a} = IR_{PP} \quad (7)$$

where I is the current flowing in power line 50. The resistance $R_{PP}$ generally representative of the primary electrical path 21 of mated connector pair 20 is then calculated from $$R_{PP} = v_3 / I \quad (8)$$

where $v_3$ and I are both known values; $v_3$ from the third voltage measurement and I from the first current measurement. Like actual resistance $R_{RB}$, if the actual $R_{PP}$ is unacceptably high as compared to a predetermined acceptable range for $R_{PP}$, mated connector pair 20 could be repaired or replaced to correct the problem.

Similar to the technique for deriving $R_{PP}$, the resistance $R_{PR}$ generally representative of the primary electrical path 23 of mated connector pair 20 for return line 60 is derived from the second current and fourth voltage measurements. The fourth voltage measurement $v_4$ represents the voltage measured across backup switch 24f. Referring to FIG. 2, voltage $v_4$ can also be derived from the equation $$v_4 = v_{23b-23a} + v_{24c} + v_{24e-24g} \quad (9)$$

where $v_{23b-23a}$ is the internodal voltage drop across primary electrical path 23 for return line 60; $v_{24c}$ is the voltage drop across backup switch 24c; and $v_{24e-24g}$ is the voltage drop across backup nodes 24e and 24g. Though current I will be flowing across primary electrical path 23 along return line 60, there will be negligible current flowing through backup switch 24c and between backup nodes 24e and 24g because backup switch 24f and test switch 220b are both open. This negligible current is an extremely small current on the order of microamps and is due solely to voltage sensor 220f. This microamp level current gives rise to a microvoltage drop that is negligible in comparison to voltage drop $v_{23b-23a}$ across primary electrical path 23 interconnecting main nodes 23a and 23b of mated connector pair 20. Equation (9) then becomes $$v_4 = v_{23b-23a} = IR_{PR} \quad (10)$$

where I is the current flowing in power line 50. The resistance $R_{PR}$ generally representative of the primary electrical path 23 of mated connector pair 20 is then calculated from $$R_{PR} = v_4 / I \quad (11)$$

where $v_4$ and I are both known values; $v_4$ from the fourth voltage measurement and I from the second current measurement. Like actual resistance $R_{PP}$, if the actual $R_{PR}$ is unacceptably high as compared to a predetermined acceptable range for $R_{PR}$, mated connector pair 20 could be repaired or replaced to correct the problem.

As each of the backup switches of the present invention preferably takes the form of a field effect transistor, when closed they exhibit known characteristic resistances and voltage drops. A rough estimate of acceptable values for resistances $R_{PP}$, $R_{PR}$, $R_{R1}$ and $R_{R2}$ ranges approximately on the order of 0.10 milliohms best case to 100–150 milliohms worst case for the dual connection system 40 envisioned.

Once the derived resistances $R_{RB}$, $R_{PP}$ and $R_{PR}$ have been compared to the predetermined acceptable values and the results have been reported to central computer 150, central computer 150 commands the next vehicle computer in chain to perform this procedure. Sequentially controlled by central computer 150, each connector control means repeats this procedure until all of the connections between the rail vehicles have been tested. At least one electrical path for each electrical line interconnected between rail vehicles must be viable to allow proper testing of the connections between subsequent rail vehicles. It should be apparent that if the dual connection system 40 encounters an electrical line whose primary and redundant electrical paths have both open circuited or otherwise exhibited unacceptable resistances, central computer 150 would immediately report the results received from each of the connector control means to the operator of the system. This will allow the operator to take appropriate corrective action before departure of the train from a terminal yard, train station, way station or other point at which such testing is to be performed.

Referring now to the presently preferred embodiment of the present invention illustrated in FIG. 3, this embodiment includes all the features of, and performs substantially the same as, the alternative embodiment illustrated in FIG. 2. The presently preferred embodiment, however, includes a pair of oppositely directed Schottky diodes within each bidirectional circuit. For example, as shown in FIG. 3, mateable connector 20b has a pair of bidirectional circuits 22b and 24b. Bidirectional circuit 22b interconnects main node 21b and backup node 22g for power line 50 disposed on rail vehicle 200. Bidirectional circuit 22b includes normally closed backup switch 22f and a pair of oppositely directed Schottky diodes. The two Schottky diodes are connected in parallel circuit relationship with each other and backup switch 22f. If backup switch 22f were to fail, one diode would allow current flow in a direction opposing that allowed by the other diode. Likewise, bidirectional circuit 24b interconnects main node 23b and backup node 24g for return line 60 disposed on rail vehicle 200. Bidirectional circuit 24b includes normally closed backup switch 24f and another pair of oppositely directed Schottky diodes connected in the same manner. Each of the mateable connectors of the other rail vehicles of the train also have a pair of oppositely directed Schottky diodes disposed in the same manner as the Schottky diodes of connector 20b.

Regarding the purpose for the diodes, each Schottky diode pair serves as a backup electrical path to the backup switch to which it corresponds thereby providing a second level of redundancy. Each primary electrical path is therefore backed up by a redundant electrical path having its own built-in backup path. Referring to FIG. 3, for example, redundant electrical path 22 between main nodes 21a and 21b extends in its entirety from main node 21a through bidirectional circuit 22a between backup nodes 22e and 22g through bidirectional circuit 22b to main node 21b. If primary electrical path 21 between main nodes 21a and 21b were to fail, redundant electrical path 22 would carry the current load. Assuming backup switch 22c also failed, the Schottky diodes would provide an electrical route around the affected backup switch.

It should be apparent that each backup switch is backed up by a pair of oppositely directed Schottky diodes because rail vehicles are typically bidirectional, that is they may be serially inserted into a train without concern as to which end is to point towards the front or rear of the train. Accordingly, no matter which way a rail vehicle is inserted into a train, if a backup switch fails one of the pair of oppositely directed Schottky diodes would serve as the backup electrical path to the failed backup switch in the affected bidirectional circuit.

In the presently preferred embodiment of the present invention, unlike in the alternative embodiment, there will be no current sharing between each primary electrical path and its corresponding redundant electrical path. A Schottky diode will typically not conduct until there is approximately 200 to 400 millivolts across its contacts. The voltage threshold of a Schottky diode is thus far greater than the normal threshold voltage of a backup switch. Likewise, the voltage threshold of a Schottky diode is thus far greater than the normal threshold voltage of any of the internodal paths of a mated connector pair such as connector 20. The Schottky diodes will thus not normally conduct and the bidirectional circuits will behave as if the Schottky diodes were not present. If a given backup switch does fail, however, all of the current will flow through the primary electrical path corresponding to the failed backup switch and none through the redundant electrical path because of the 0.2 to 0.4 volt threshold voltage of the Schottky diode. Only if the primary electrical path also fails will current flow through the redundant electrical path for the affected electrical line. Though each pair of Schottky diodes does not affect the operation of its corresponding bidirectional circuit, it does insure that even if a vehicle computer fails and its normally closed backup switches open for some reason, the corresponding redundant electrical paths will still be operational as current will flow through the Schottky diodes instead of the failed backup switch(es). The Schottky diodes thus provide the dual connection system 40 of FIG. 3 with further measure of redundancy.

Though the dual connection system 40 is preferably used to serially interconnect an electronic brake control system between the rail vehicles of a train as set forth above, it may also be used to link the serially interconnectable parts of another type of electrical system altogether.

While the presently preferred and alternative embodiments for carrying out the instant invention have been set forth in detail according to the Patent Act, those persons of ordinary skill in the technical art to which this invention pertains will recognize various alternative ways of practicing the invention without departing from the spirit and scope of the appended claims. Those of ordinary skill will also recognize that the foregoing description is merely illustrative and is not intended to limit any of the following claims to any particular narrow interpretation.

Accordingly, to promote the progress of science and useful arts, I secure for myself by Letters Patent exclusive rights to all subject matter embraced by the following claims for the time prescribed by the Patent Act.

I claim:

1. A dual connection system for an electrical system of a train having a power line and a return line each of which requiring electrical interconnection between serially interconnectable vehicles of said train, said dual connection system comprising:

(a) a mateable connector at each end of each of said vehicles through which said vehicles interconnect serially from a head of train vehicle successively to an end of train vehicle, each of said mateable connectors having a pair of bidirectional circuits each of which interconnecting a main node and a backup node for each said line disposed on said vehicle such that one of said main nodes affixes to said power line and the other of said main nodes affixes to said return line disposed on said vehicle so that when a pair of said mateable connectors are mated, said main nodes affixed to said power line communicate as a primary path for said power line and said backup nodes corresponding thereto communicate as part of a redundant path for said power line and said main nodes affixed to said return line communicate as a primary path for said return line and said backup nodes corresponding thereto communicate as part of a redundant path for said return line so that during a nontest mode of operation of said dual connection system each of said redundant paths provides a connection redundant to said primary path corresponding thereto;

(b) a connector control means in each of said vehicles for determining, during a test mode of operation of said dual connection system, integrity of said primary and said redundant paths located between a current one of said vehicles and a previous one of said vehicles; and (c) a central computer for controlling each of said connector control means so that each of said pairs of connectors interconnecting said vehicles from said head of train vehicle to said end of train vehicle is tested sequentially during said test mode and for receiving from each of said connector control means results of said determination and for reporting said results to an operator of said train.

2. The dual connection system as recited in claim 1 wherein each of said bidirectional circuits includes a backup switch, normally closed during said nontest mode of operation, controlled by said connector control means.

3. The dual connection system as recited in claim 2 wherein said backup switch is a field effect transistor.

4. The dual connection system as recited in claim 2 wherein each of said bidirectional circuits further includes a pair of oppositely directed Schottky diodes connected in parallel with each other and said backup switch such that one of said diodes allows current flow in a direction opposing that allowed by the other of said diodes upon failure of said backup switch.

5. The dual connection system as recited in claim 2 wherein said connector control means includes:

(a) a test circuit interconnecting said backup nodes across said redundant paths in each of said connectors, said test circuit having a predetermined resistive load in series with a test switch normally open during said nontest mode of operation;

(b) a voltage sensing means for measuring voltage at preselected sites within said connector in said current vehicle;

(c) a current sensing means for measuring current flowing in any one of said lines; and (c) a vehicle computer for selectively controlling opening and closing of said backup and said test switches as said voltage and said current sensing means, controlled by said vehicle computer, measure said voltages and said currents during said test mode and for deriving from said current and said voltage measurements resistances generally representative of said primary and said redundant paths between said current and said previous vehicles and for comparing said resistances to predetermined acceptable values and for reporting to said central computer whether any of said paths are one of defective and functional on basis of said comparison.

6. The dual connection system as recited in claim 5 wherein:

(a) said voltage sensing means makes said voltage measurements at said preselected sites including (i) a first measurement of voltage across said test circuit of said connector of said current vehicle while all said backup switches are closed and said test switches are open in said previous vehicle and all of said backup switches are open and said test switches are open in said current vehicle, (ii) a second measurement of voltage across said test circuit of said connector of said current vehicle while all said backup switches are closed and said test switches are open in said previous vehicle and all of said backup switches are open and said test switches are open in said current vehicle with is exception of said test switch in said connector being closed, (iii) a third measurement of voltage across said bidirectional circuit corresponding to said power line in said connector of said current vehicle while all said backup switches are closed and said test switches are open in said previous vehicle and all of said backup switches are closed and said test switches are open in said current vehicle with exception of said backup switch corresponding to said power line in said connector being open, and (iv) a fourth measurement of voltage across said bidirectional circuit corresponding to said return line in said connector of said current vehicle while all said backup switches are closed and said test switches are open in said previous vehicle and all of said backup switches are closed and said test switches are open in said current vehicle with exception of said backup switch corresponding to said return line in said connector being open; and (b) said current sensing means makes said current measurements including (i) a first measurement of current flowing in said power line in said current vehicle while all said backup switches are closed and said test switches are open in said previous vehicle and all of said backup switches are closed and said test switches are open in said current vehicle with exception of said backup switch corresponding to said power line in said connector being open, and (ii) a second measurement of current flowing in said power line in said current vehicle while all said backup switches are closed and said test switches are open in said previous vehicle and all of said backup switches are closed and said test switches are open in said current vehicle with exception of said backup switch corresponding to said return line in said connector being open;

such that said vehicle computer derives (1) said resistance generally representative of said redundant paths of said pair of connectors from said first and said second voltage measurements and said predetermined resistive load, (2) said resistance generally representative of said primary path of said pair of connectors for said power line from said first current and said third voltage measurements and (3) said resistance generally representative of said primary path of said pair of connectors for said return line from said second current and said fourth voltage measurements.

7. The dual connection system as recited in claim 1 wherein said central computer is a locomotive computer which controls operation of a head of train locomotive of said train such that a programming means provided to said locomotive computer enables said locomotive computer to perform the functions attributed to said central computer.

8. The dual connection system as recited in claim 5 wherein said vehicle computer is a preexisting computer which controls operation of said vehicle such that a vehicle programming means provided to said preexisting computer enables said preexisting computer to perform the functions attributed to said vehicle computer.

9. A dual connection system for electrically interconnecting vehicles of a train having an electrical system whose power and return lines are formed, respectively, through sequential interconnection of a power wire and a return wire disposed on each said vehicle, said dual connection system comprising:

(a) a pair of mateable connectors for electrically interconnecting adjacently disposed vehicles through a primary path and a redundant path for each said line formed through mating of said pair of connectors, (i) a first of said pair of connectors, disposed on a previous one of said vehicles, having a pair of bidirectional circuits each of which interconnecting a main node and a backup node for each said wire disposed on said previous vehicle, one of said main nodes affixed to one of said wires disposed on said previous vehicle and the other of said main nodes affixed to the other of said wires disposed on said previous vehicle, (ii) a second of said pair of connectors, disposed on a current one of said vehicles, having a pair of bidirectional circuits each of which interconnecting a main node and a backup node for each said wire disposed on said current vehicle, one of said main nodes affixed to one of said wires disposed on said current vehicle and the other of said main nodes affixed to the other of said wires disposed on said current vehicle, so that when said pair of connectors are mated, said main nodes affixed to said power wires communicate as said primary path and said backup nodes corresponding thereto communicate as part of said redundant path for said power line and said main nodes affixed to said return wires communicate as said primary path and said backup nodes corresponding thereto communicate as part of said redundant path for said return line so that during a nontest mode of operation of said dual connection system each of said redundant paths provides a connection redundant to said primary path corresponding thereto;

(b) a connector control means in each said vehicle for determining, during a test mode of operation of said dual connection system, integrity of said primary and said redundant paths for each said line formed between said current and said previous vehicles; and (c) a central computer for controlling each of said connector control means so that each of said pairs of connectors interconnecting said vehicles from a head of said train to an end of said train is tested sequentially during said test mode and for receiving from each of said connector control means results of said determination and for reporting said results to an operator of said train.

10. The dual connection system as recited in claim 9 wherein each of said bidirectional circuits includes a backup switch, normally closed during said nontest mode of operation, controlled by said connector control means.

11. The dual connection system as recited in claim 10 wherein said backup switch is a field effect transistor.

12. The dual connection system as recited in claim 10 wherein each of said bidirectional circuits further includes a pair of oppositely directed Schottky diodes connected in parallel with each other and said backup switch such that one of said diodes allows current flow in a direction opposing that allowed by the other of said diodes upon failure of said backup switch.

13. The dual connection system as recited in claim 10 wherein said connector control means includes:

(a) a test circuit interconnecting said backup nodes across said redundant paths in each of said first and second connectors, said test circuit having a predetermined resistive load in series with a test switch normally open during said nontest mode of operation;

(b) a voltage sensing means for measuring voltage at preselected sites within said second connector;

(c) a current sensing means for measuring current flowing in any one of said lines; and (c) a vehicle computer for selectively controlling opening and closing of said backup and said test switches as said voltage and said current sensing means, controlled by said vehicle computer, measure said voltages and said currents during said test mode and for deriving from said current and said voltage measurements resistances generally representative of said primary and said redundant paths and for comparing said resistances to predetermined acceptable values and for reporting to said central computer whether any of said paths are one of defective and functional on basis of said comparison.

14. The dual connection system as recited in claim 13 wherein:

(a) said voltage sensing means makes said voltage measurements at said preselected sites including (i) a first measurement of voltage across said test circuit of said second connector while all said backup switches are closed and said test switches are open in said previous vehicle and all of said backup switches are open and said test switches are open in said current vehicle, (ii) a second measurement of voltage across said test circuit of said second connector while all said backup switches are closed and said test switches are open in said previous vehicle and all of said backup switches are open and said test switches are open in said current vehicle with exception of said test switch in said second connector being closed, (iii) a third measurement of voltage across said bidirectional circuit corresponding to said power wire of said second connector while all said backup switches are closed and said test switches are open in said previous vehicle and all of said backup switches are closed and said test switches are open in said current vehicle with exception of said backup switch corresponding to said power line in said second connector being open, and (iv) a fourth measurement of voltage across said bidirectional circuit corresponding to said return wire of said second connector while all said backup switches are closed and said test switches are open in said previous vehicle and all of said backup switches are closed and said test switches are open in said current vehicle with exception of said backup switch corresponding to said return line in said second connector being open; and (b) said current sensing means makes said current measurements including (i) a first measurement of current flowing in said power line in said current vehicle while all said backup switches are closed and said test switches are open in said previous vehicle and all of said backup switches are closed and said test switches are open in said current vehicle with exception of said backup switch corresponding to said power line in said second connector being open, and (ii) a second measurement of current flowing in said power line in said current vehicle while all said backup switches are closed and said test switches are open in said previous vehicle and all of said backup switches are closed and said test switches are open in said current vehicle with exception of said backup switch corresponding to said return line in said second connector being open;

such that said vehicle computer derives (1) said resistance generally representative of said redundant paths of said pair of connectors from said first and said second voltage measurements and said predetermined resistive load, (2) said resistance generally representative of said primary path of said pair of connectors for said power line from said first current and said third voltage measurements and (3) said resistance generally representative of said primary path of said pair of connectors for said return line from said second current and said fourth voltage measurements.

15. The dual connection system as recited in claim 9 wherein said central computer is a locomotive computer which controls operation of a head of train locomotive of said train such that a programming means provided to said locomotive computer enables said locomotive computer to perform the functions attributed to said central computer.

16. A dual connection system for an electrical system having a power line and a return line each of which requiring electrical interconnection between serially interconnectable parts of said electrical system, said dual connection system comprising:

(a) a mateable connector at each end of each of said parts through which said parts interconnect serially from a main one of said parts successively to a last one of said parts, each of said mateable connectors having a pair of bidirectional circuits each of which interconnecting a main node and a backup node for each said line disposed on said part such that one of said main nodes affixes to said power line and the other of said main nodes affixes to said return line disposed on said part so that when a pair of said mateable connectors are mated, said main nodes affixed to said power line communicate as a primary path for said power line and said backup nodes corresponding thereto communicate as part of a redundant path for said power line and said main nodes affixed to said return line communicate as a primary path for said return line and said backup nodes corresponding thereto communicate as part of a redundant path for said return line so that during a nontest mode of operation of said dual connection system each of said redundant paths provides a connection redundant to said primary electrical path corresponding thereto;

(b) a connector control means disposed in each of said parts for determining, during a test mode of operation of said dual connection system, integrity of said primary and said redundant paths located between a current one of said parts and a previous one of said parts; and (c) a central computer, disposed on said main part, for controlling each of said connector control means so that each of said pairs of connectors interconnecting said parts from said main part to said last part is tested sequentially during said test mode and for receiving from each of said connector control means results of said determination and for reporting said results to an operator of said electrical system.

17. The dual connection system as recited in claim 16 wherein each of said bidirectional circuits includes a backup switch, normally closed during said nontest mode of operation, controlled by said connector control means.

18. The dual connection system as recited in claim 17 wherein each of said bidirectional circuits further includes a pair of oppositely directed Schottky diodes connected in parallel with each other and said backup switch such that one of said diodes allows current flow in a direction opposing that allowed by the other of said diodes upon failure of said backup switch.

19. The dual connection system as recited in claim 17 wherein said connector control means includes:

(a) a test circuit interconnecting said backup nodes across said redundant paths in each of said connectors, said test circuit having a predetermined resistive load in series with a test switch normally open during said nontest mode of operation;

(b) a voltage sensing means for measuring voltage at preselected sites within said connector in said current part;

(c) a current sensing means for measuring current flowing in any one of said lines; and (c) a dedicated computer for selectively controlling opening and closing of said backup and said test switches as said voltage and said current sensing means, controlled by said dedicated computer, measure said voltages and said currents during said test mode and for deriving from said current and said voltage measurements resistances generally representative of said primary and said redundant paths between said current and said previous parts and for comparing said resistances to predetermined acceptable values and for reporting to said central computer whether any of said paths are one of defective and functional on basis of said comparison.

20. The dual connection system as recited in claim 19 wherein:

(a) said voltage sensing means makes said voltage measurements at said preselected sites including (i) a first measurement of voltage across said test circuit of said connector of said current part while all said backup switches are closed and said test switches are open in said previous part and all of said backup switches are open and said test switches are open in said current part, (ii) a second measurement of voltage across said test circuit of said connector of said current part while all said backup switches are closed and said test switches are open in said previous part and all of said backup switches are open and said test switches are open in said current part with exception of said test switch in said connector being closed, (iii) a third measurement of voltage across said bidirectional circuit corresponding to said power line in said connector of said current part while all said backup switches are closed and said test switches are open in said previous part and all of said backup switches are closed and said test switches are open in said current part with exception of said backup switch corresponding to said power line in said connector being open, and (iv) a fourth measurement of voltage across said bidirectional circuit corresponding to said return line in said connector of said current part while all said backup switches are closed and said test switches are open in said previous part and all of said backup switches are closed and said test switches are open in said current part with exception of said backup switch corresponding to said return line in said connector being open; and (b) said current sensing means makes said current measurements including (i) a first measurement of current flowing in said power line in said current part while all said backup switches are closed and said test switches are open in said previous part and all of said backup switches are closed and said test switches are open in said current part with exception of said backup switch corresponding to said power line in said connector being open, and (ii) a second measurement of current flowing in said power line in said current part while all said backup switches are closed and said test switches are open in said previous part and all of said backup switches are closed and said test switches are open in said current part with exception of said backup switch corresponding to said return line in said connector being open;

such that said part computer derives (1) said resistance generally representative of said redundant paths of said pair of connectors from said first and said second voltage measurements and said predetermined resistive load, (2) said resistance generally representative of said primary path of said pair of connectors for said power line from said first current and said third voltage measurements and (3) said resistance generally representative of said primary path of said pair of connectors for said return line from said second current and said fourth voltage measurements.

\* \* \* \* \*